United States Patent [19]

Kondo

[11] 4,079,400
[45] Mar. 14, 1978

[54] OPTICAL BLADE DRIVE APPARATUS

[75] Inventor: Toshihiro Kondo, Chofu, Japan

[73] Assignees: Toshihiro Kondo, Chofu; Fuji Photo Film Co., Ltd., Minami-ashigara, both of Japan

[21] Appl. No.: 690,356

[22] Filed: May 26, 1976

[30] Foreign Application Priority Data

May 26, 1975  Japan .................................. 50-62825

[51] Int. Cl.² .............................................. G03B 9/08
[52] U.S. Cl. ...................................... 354/234; 310/13
[58] Field of Search ................. 354/234, 235; 310/12, 310/14

[56] References Cited

U.S. PATENT DOCUMENTS

| 3,136,934 | 6/1964 | Henry-Baudot | 310/12 X |
| 3,654,845 | 4/1972 | Fahlenberg et al. | 354/234 |
| 3,987,473 | 10/1976 | Kondo | 354/234 |

Primary Examiner—Donovan F. Duggan

[57] ABSTRACT

An optical blade drive apparatus for use in an optical instrument includes a linear motor system which electromagnetically actuates a blade ring for rotation at a high speed. The linear motor system comprises permanent magnets arranged to provide a centered magnetic force and an electromagnetic coil assembly formed by overlapping a number of printed wiring strip sheets in slightly offset positions.

5 Claims, 6 Drawing Figures

OPTICAL BLADE DRIVE APPARATUS

BACKGROUND OF THE INVENTION

1. Field of the Invention

This invention relates to an optical blade drive apparatus, and more particularly to an apparatus which includes a linear motor system which electromagnetically actuates the blade ring for rotation at an extremely high speed.

2. Description of the Prior Art

In general, conventional optical blades for use in an optical instrument such as a photographic camera are mechanically driven so that they can control the amount of light admitted through the lens and prevent light from passing through the lens while the shutter release button is being set. In most cases, the blades of such type have their opening and closing movement associated with other mechanical elements or assemblies. Furthermore, the amount of movement of the blades must be controlled with great accuracy, and mechanisms for driving the blades mechanically, such as power transmission gears and other links and other associated assemblies which control the movement of the blades are complicated and large. As a whole, therefore, the mechanisms are extremely costly.

There is also known a camera of the type which has shutter and diaphragm blades actuated by an electrical control circuit. In all cameras of such type, however, the circuit is simply a timing circuit which controls the timing action of all mechanical elements associated with the blades. Thus, in driving the blades, it is necessary to have energy stored mechanically such as by the cocking of a spring which stores the required energy therein. In the electrically controlled focal-plane shutter, for example, the winding action which sets the shutter first urges the springs of the associated first and second shutter curtains into a cocked state to store the energy therein, and the energy of each spring is then retained by means of a solenoid the action of which is controlled by the electrical circuit. Then, under the control of the same circuit, the solenoids release the springs so as to apply their stored energy to the shutter curtains with proper timing. The shutter drive of such type can be made simpler and smaller in size than the entirely mechanically driven shutter. However, the springs must still be cocked by additional mechanical means, and the energy of the springs must also mechanically be transmitted for driving the shutter curtains. Thus, there is a limit on the reduction in size of the structure which can be attained and in order to make a smaller mechanism, it is necessary to drive all moving parts electrically and directly without an intermediate mechanical structure. For this purpose, there have been proposed a number of methods and structures. In most of these, however, the shutter and diaphragm blades are driven by means of electromagnetic forces provided by a combination of electromagnetic coils, for example, single bobbin coil assemblies, and permanent magnets. Such a driving system is disadvantageous in that the blades are limited in the length of their stroke and in that the coil either must be supplied with a large amount of current or must have an extremely large number of turns so that the blades can be driven at a very high speed. If, however, the number of turns of the coil is increased in a way which does not affect the magnitude of the electrical capacitance therein, the coil becomes of extremely large size. Furthermore, if a coil of a small size is used because of its low capacitance, less current will flow therethrough. Particularly, in a camera whose shutter must be driven at a high speed using a power source and a coil assembly mounted within a camera body of limited space, the disadvantages mentioned above are encountered and become most serious problems.

SUMMARY OF THE INVENTION

In view of the disadvantages and problems inherent in conventional systems, it is, therefore, a principal object of the present invention to provide a simple and compact apparatus for driving optical blades, such as shutter blades and diaphragm blades, at a very high speed. In order to achieve the above object, there is employed a linear motor constructed such that the blades are driven by means of the electromagnetic forces produced thereby. Although the apparatus in accordance with this invention has a simple and compact construction, it is capable of driving the blades with a sufficiently long reciprocating stroke and at an extremely high speed. The invention resides in its unique construction, combination of elements and arrangement of parts. More specifically, constructional features of the invention include; a blade ring which drives the optical blades as it rotates; a fixed cylindrical casing which holds the blade ring for rotation, a plurality of permanent magnets rigidly secured to the casing, and an electromagnetic coil assembly formed by a plurality of insulating base sheets carrying wiring strips printed thereon and located opposite the permanent magnets and connected to the blade ring. The combined permanent magnets and electromagnetic coil assembly provide a linear motor system which can actuate the drive ring for rotation which in turn drives the blades. The linear motor system so constructed in accordance with the invention is capable of driving the blades with great accuracy and with a sufficiently long reciprocating stroke. As the coil on each base sheet need not be increased in the number of its turns, the resulting coil has relatively great electrical capacitance and permits a sufficiently great amount of current to pass therethrough so that the blades can be driven at an extremely high speed. As will be exemplified in detail hereinafter, the electromagnetic coil assembly consists of a plurality of insulating base sheets having thin wiring strips printed thereon which are bent into a U-shaped cross section and thus the apparatus is compact as a whole.

DESCRIPTION OF THE PREFERRED EMBODIMENT

Figure 1:
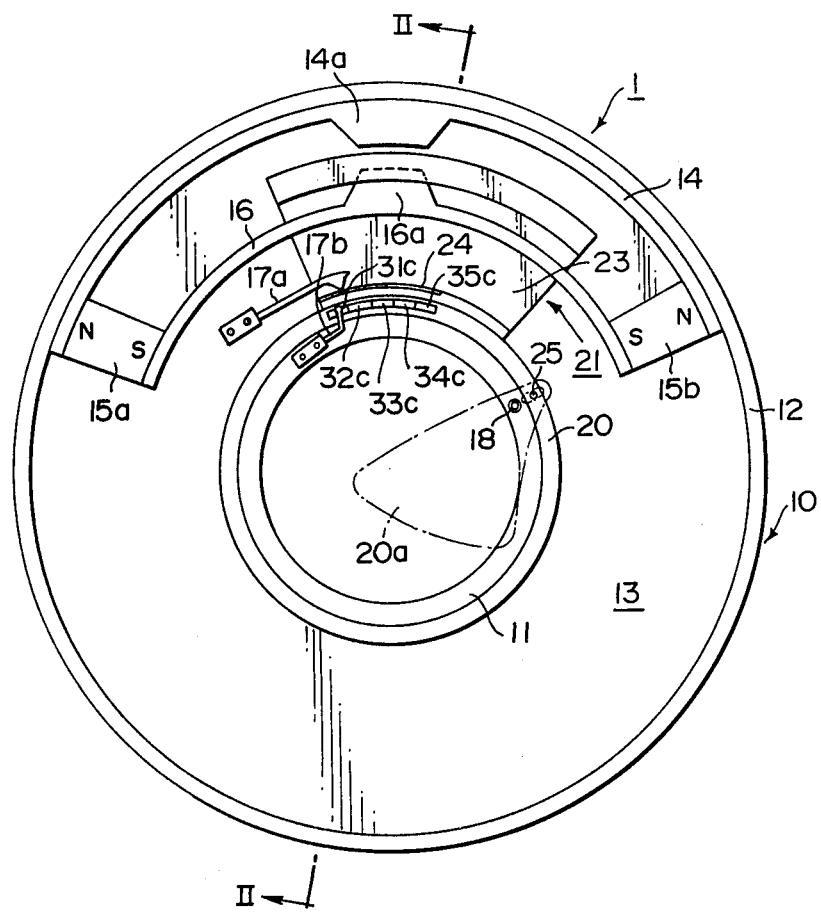
FIG. 1 is a plan view of a preferred embodiment of the invention.
Figure 2:
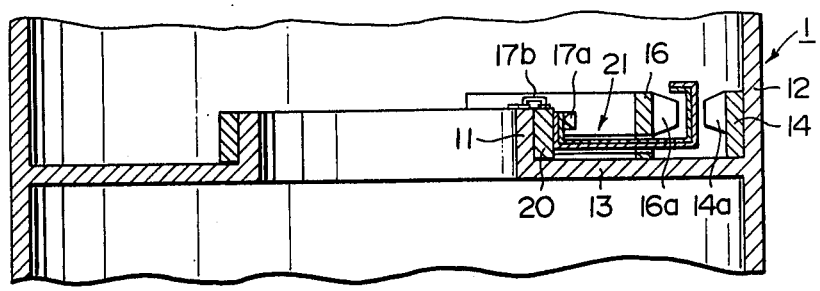
FIG. 2 is a partial sectional view taken along the line II—II in FIG. 1.
Figure 3:
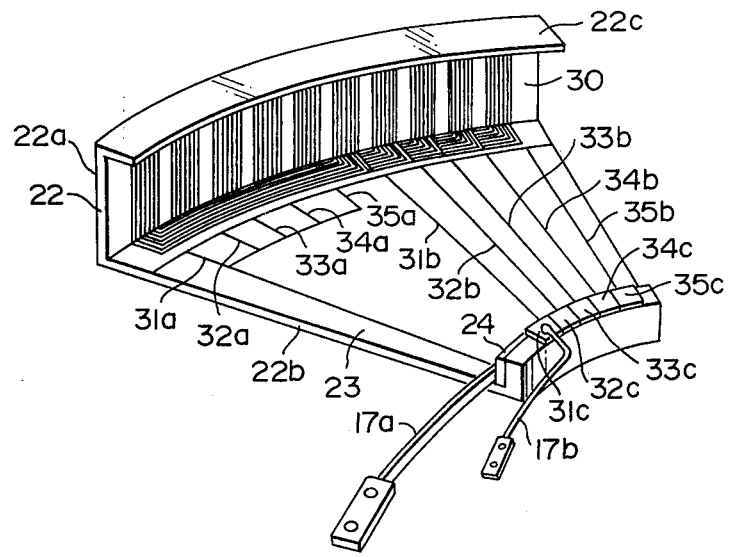
FIG. 3 is a schematic diagram illustrating in detail the construction of the blade drive assembly.

The invention will now be described in more detail with reference to a preferred embodiment thereof. FIG. 1 is a plan view of a preferred embodiment of the invention, and FIG. 2 is a sectional view taken along the line II—II in FIG. 1. A drive apparatus 1 according to the invention is generally shown in FIG. 1, which includes a socket pipe 11 having an aperture therethrough, a fixed cylindrical casing 10 having an outer pipe 12 connected to the socket pipe 11 by means of a base plate 13, and a blade ring 20 having a blade actuating part 21 and rotatably fitting around the socket pipe 11. As is well known, the blade ring 20 is associated with the shutter and diaphragm blades 20a so that the blades 20a can be opened and closed with the rotary reciprocating movement of the blade ring 20. A first magnetoconductive plate 14 is rigidly fixed to the inner wall of the outer pipe 12 and has both ends thereof connected to permanent magnets 15a and 15b. A second magnetoconductive plate 16 is provided parallel with the first plate 14, and has both ends thereof connected to the magnets 15a and 15b. The plate 16 is supported by the magnets 15a and 15b in such a manner that a space is provided between the plate 16 and the base plate 13 of the casing 10 through which the blade actuating part 21 of the blade ring 20 can be inserted for reciprocating movement. The plates 14 and 16 have projecting portions 14a and 16a of a substantially trapezoidal cross section at the intermediate positions thereof. Projecting portions 14a and 16a are spaced opposite each other. As particularly shown in FIG. 1, one end of each of plates 14 and 16 is in contact with the magnet 15a while the other end of each is in contact with magnet 15b. The magnets 15a and 15b are arranged in polarity so that the ends of plate 14 are in contact with like poles of the magnets and the ends of plate 15 are in contact with the other like poles thereof. As a consequence, the lines of magnetic force of the magnets 15a and 15b are concentrated at the projecting portions 14a and 16a. As described earlier, the blade ring 20 has the actuating part 21 as an integral part thereof, and as shown in detail in FIG. 3, the actuating part 21 includes a support member 22 substantially sector-shaped in plane projection and made of a non-magnetoconductive metal such as magnesium, aluminium, duralumin or the like and having a vertical side wall 22a, an upper part 22c extending from the side wall 22a at right angles and a base part 22b extending from the side wall 22a at right angles, the three parts forming a substantially U-shaped recessed portion in cross section, a printed coil plate 30, which will be described in detail later, so formed as to fit in and be held by the recessed portion, and a printed wiring plate 23 rigidly mounted on the base part 22b.

Figure 4A:
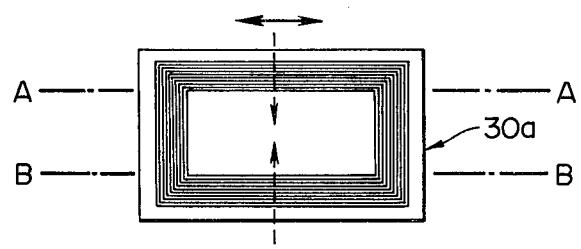
FIG. 4A is an illustrative view showing a typical sheet carrying wiring strips printed thereon.
Figure 4B:
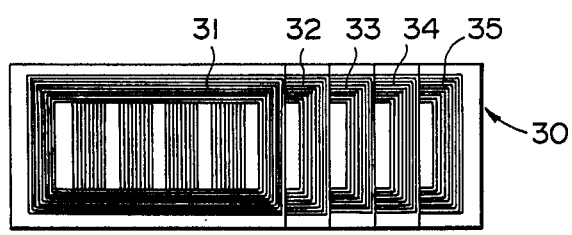
FIG. 4B shows a printed coil plate formed by overlapping a number of sheets.
Figure 4C:
FIG. 4C is a sectional view showing the printed coil plate so folded as to have a U-shaped cross section.

As shown in FIGS. 4A and 4B, the printed coil plate 30 consists of a plurality of insulating base sheets 30a each having conductive wiring strips printed thereon, the wiring strips being formed on an insulating polyester base sheet, for example, by vacuum-evaporation depositing thereon copper, mercury or the like and by then etching it in a known manner. The wiring strips may be replaced by thin coils of wire. A number of sheets 30a are arranged in slightly offset overlapping relationship as indicated in FIG. 4, for example, are then bonded by means of polyester adhesive resin or the like. The row of bonded sheets is then bent into a substantially U-shaped cross section as shown in FIG. 4C. For convenience of description and easiness of understanding, the width of the offset portion of the overlapping adjacent sheets 30a is shown to be greater than that used in actual practice. In a practical arrangement each sheet is offset by an amount corresponding to half to one-third the width of the actuating portion of a single printed wiring strip.

In the sheet 30a shown in FIG. 4A, the upper and lower portions (above the line A—A and below the line B—B) of the printed wiring strips provide lines of magnetic force (shown in broken lines) perpendicular to the direction of the desired movement (shown by arrows) of the sheet 30a when the wiring strips are energized by passage of current. The upper and lower portions will be referred to herein as the "non-actuating portion" of the wiring strips, because they have almost no active part in driving the blade ring 20 when the wiring strips are electromagnetically energized. The other portion between the lines A—A and B—B will be referred to herein as the "actuating portion". As described earlier, the printed coil plate 30 fits in the recessed portion of the support member 22 and is held thereby. Each of the printed wiring strips 31 to 35 has a lead-out wire 31a to 35a at one end thereof, all wires 31a to 35a being interconnected on the printed wiring plate 23 and then connected to a pole terminal plate 24 fixed to the outer rim of the blade ring 20. The pole terminal plate 24 is contacted by a first brush 17a one end of which is rigidly secured to the base plate 13 of the fixed casing 10, the brush 17a making contact with the pole plate 24 over the range of rotary movement of the blade ring 20. The lead-out wires 31b to 35b from the other ends of the printed wiring strips 31 to 35 are individually printed on the plate 23 and connected to corresponding contacts 31c to 35c. The contacts 31c to 35c are insulated from each other, and are provided on the upper side of the blade ring 20. A second brush 17b has one end thereof rigidly secured to the socket pipe 11 and the other end thereof contacts any one of the contacts 31c to 35c. The first and second brushes 17a and 17b are connected to a power source not shown. Thus, when the second brush 17b is brought in contact with a given contact, the circuit for the wiring strip which corresponds to the given contact will be completed and current will flow therethrough.

The blade ring 20 described above rotatably fits around the socket pipe 11 with the actuating portion of the printed coil plate 30 placed vertically between and opposite the projecting portions 14a and 16a of the first and second magnetoconductive plates 14 and 16, as shown in FIGS. 1 and 2. Suppose that current flows when the second brush 17b is brought in contact with contact 31c: the printed wiring strip 31 becomes energized, causing the blade ring 20 to rotate in an counterclockwise direction under the action of the electromagnetic force of the strip 31 and the magnetic force centered at the projecting portions 14a and 16a of the plates 14 and 16. The second brush 17b is then brought out of contact with the contact 31c, and engages a contact 32c next to the contact 31c so that the strip 31 is deenergized while at the same time the adjacent strip 32 becomes energized, causing the blade ring 20 to further rotate because of the electromagnetic force of the strip 32 and the magnetic force centered at the projecting portions 14a and 16a. The blade ring 20 continues to be driven in the above manner until the last strip 35, for example, becomes energized, and is then arrested by a stopper not shown.

Rotation of the blade ring 20 in a clockwise direction on returning toward the starting position may be accomplished by the action of a spring or by passing current through the individual wiring strips 31 to 35 in the opposite direction.

In the embodiment described above, the blade ring 20 has a range of movement or stroke which corresponds to the distance between the left-side part of the left-hand wiring strip 31 and the left-side part of the right-hand wiring strip 35. This is because the left-side parts and right-side parts of the wiring strips 31 to 35 have electromagnetic forces of opposite polarity when current flows through the strips 31 to 35 in the same direction.

If a further contact is provided to make each of the wiring strips 31 to 35 can conduct reverse-direction current when the blade ring 20 has moved past the left-side part of the right-hand strip 35 so that it possible to use the right-side parts of the wiring strips 31 to 35, the blade ring 20 will have its range of movement further extended.

The rotation of the blade ring 20 is transmitted to the optical blades in a known manner so that the blades can be driven. It is shown by way of example that the drive ring 20 and the socket pipe 11 are provided with pins 25 and 18, respectively, and the pins 25 and 18 engage the rectangular slot and round aperture of the diaphragm blade 20a shown in chain lines. It will be readily understood that rotation of the blade ring 20 causes the diaphragm blade 20a to open and close in the known manner. For convenience of understanding, only a single diaphragm blade is shown. It has been described in the foregoing embodiment that the magnetic forces of the two magnetoconductive plates 14 and 16 are applied to the printed coil plate 30 from both sides thereof, but the magnetic forces may be applied from one side without adversely affecting the driving force. However, application of the magnetic forces from both sides effects better driving of the plate 30 with a high speed and with a great driving power. The brushes 17a and 17b shown in the embodiment are used to make the printed wiring strips 31 to 35 conduct in sequence by consecutively making contact with the corresponding contacts 31c to 35c. Therefore, known non-contact means such as magnetic diodes, photoelectrically actuated switches and the like may be used instead of the above brushes.

The apparatus for driving the optical blades in accordance with the invention described hereinbefore in detail can drive the blades at an extremely high speed by means of the electromagnetic forces provided by the linear motor system. It can be seen from the above description of the present invention that, by eliminating a number of mechanical parts, the apparatus has a construction of considerably reduced size, can be manufactured at low costs, and is possessed of a linear motor system which can drive the blades with a sufficiently long stroke and at an extremely high speed.

Although the invention has been described by reference to several preferred embodiments thereof, it should be understood that various changes and modifications may be made without departing from the spirit and scope of the invention.

I claim:

1. In an optical instrument including a fixed socket pipe having an aperture through which an optical axis passes, and a blade ring rotatably mounted around said socket pipe, said blade ring having a peripheral wall and a central part integrally fixed thereto connected to optical blades to open and close the aperture thereby by the rotation thereof; and optical blade drive apparatus including linear motor driving means connected to the blade ring comprising:

a plurality of independent sheet-like coils each consisting of a plurality of windings fixed to said peripheral wall of said blade ring, said coils being arranged in the direction of rotation of the blade ring in slightly offset positions and having a pair of lead-out wires one of which is electrically connected with a common terminal fixed to the central part of said blade ring and extending in the direction of rotation of the blade ring and the other of which is connected with each of a number of contacts fixed to said central part of said blade ring and arranged in series in the direction of rotation of the blade ring, a permanent magnet provided at a position fixed relative to said fixed socket pipe, said permanent magnet being located at a position close to said coils, and means for successively energizing said coils to move the blade ring with respect to said permanent magnet, said coil energizing means comprising a pair of brushes one of which is in slidable contact with said common terminal and the other of which is in slidable contact with said number of contacts, said pair of brushes being connected with a power source by way of switch means.

2. An optical instrument according to claim 1, having a fixed outer casing connected to said fixed socket pipe by means of a base plate, said linear motor driving means comprising:

blade actuating means connected to the blade ring for rotation and including a nonmagnetoconductive support member substantially sector-shaped in plane projection, said support member having a recessed portion for holding said coils therein and an insulating base plate, the printed coils having a U-shaped cross section held in by said recessed portion of said support member, and printed wiring means secured on said insulating base plate of said support member, first permanent magnetic means and second permanent magnetic means located away from each other for supplying magnetic forces, a first magnetoconductive member secured to the inner wall of the outer casing and having both ends thereof connected to poles of said first and second permanent magnetic means of like polarity, and a second magnetoconductive member having both ends thereof connected to poles of said first and second permanent magnetic means of the other like polarity, said second magnetoconductive member having a spacing relative to the base plate of the outer casing through which said blade actuating means can be inserted for reciprocating movement in the horizontal direction, first conductive contact means secured to the outer rim of the blade ring and connected to said printed coils, second conductive contact means secured to the blade ring and connected to said printed coils, said second contact means including a plurality of contacts electrically insulated from each other, first brush means having one end thereof rigidly secured to the base plate of the outer casing and the other end thereof in contact with said first conductive contact means, second brush means having one end thereof rigidly secured to the socket pipe and the other end thereof adapted for making contact with said second conductive contact means.

3. An apparatus according to claim 2, wherein said coils include a plurality of insulating base sheets each having conductive wiring strips printed thereon and overlapped in slightly different positions relative to each other, said insulating base sheets being bonded by adhesive material and having upper and lower magnetically non-actuating portions bent to have a substantially U-shaped cross section adapted for being held in by said recessed portion of said support member.

4. An apparatus according to claim 2, wherein said conductive wiring strips of said base sheets have lead-out terminals at one end interconnected with each other on said wiring means and connected to said first conductive contact means, and have lead-out terminals at the other end individually connected on said printed wiring means to the corresponding contacts of said second conductive contact means.

5. An apparatus according to claim 2, wherein said first magnetoconductive member has a projecting portion at the intermediate position thereof, and said second magnetoconductive member has a projecting portion at the intermediate position thereof, said two projecting portions being located opposite and away from each other, whereby the lines of magnetic forces provided by said first and second permanent magnetic means can be centered at said two projecting portions.

* * * * *